J. G. McMICHAEL.
RAIL JOINT.
APPLICATION FILED FEB. 28, 1910.
1,024,736.
Patented Apr. 30, 1912.
2 SHEETS—SHEET 2.
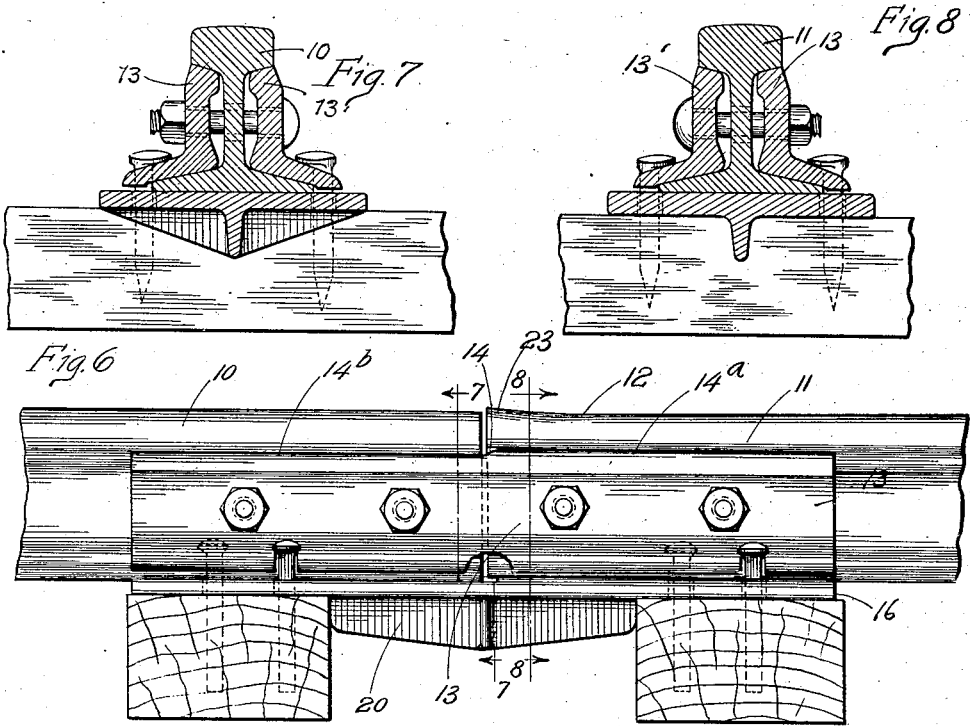
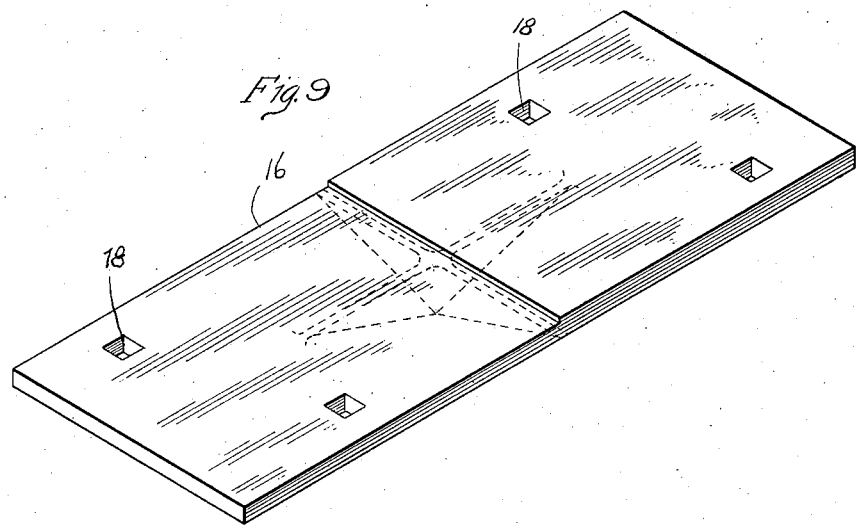

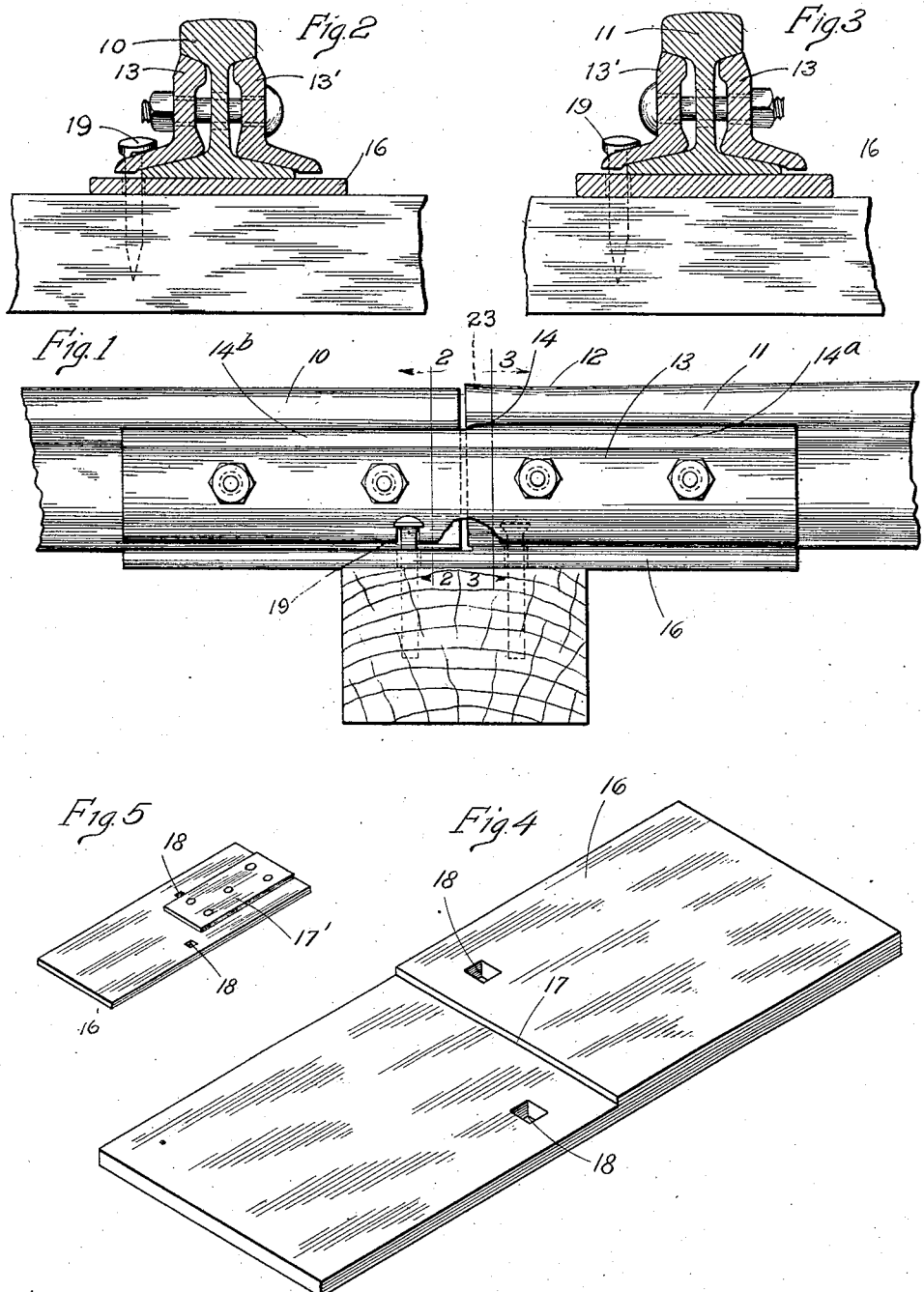

UNITED STATES PATENT OFFICE.

JAMES G. McMICHAEL, OF CHICAGO, ILLINOIS.

RAIL-JOINT.

1,024,736.  Specification of Letters Patent.  Patented Apr. 30, 1912.

Application filed February 28, 1910. Serial No. 546,374.

*To all whom it may concern:*

Be it known that I, JAMES G. McMICHAEL, a citizen of the United States, residing at Chicago, in the county of Cook and State of Illinois, have invented certain new and useful Improvements in Rail-Joints, of which the following is a specification.

My invention relates to improvements in rail joints, and more particularly to a method and means of repairing worn rail joints.

It is well known that in many joints, particularly in straight-away track, the pounding of the car in passing from the "leaving" rail to the "receiving" rail, concaves the head of the latter rail, and thereby seriously affects the track surface. Further, where the rails are jointed by bars, the pounding of the cars over the joint distorts or depresses the contacting surface of the bars or angle plates below the head of the concaved rail. For the repair of such worn joints, it has heretofore been customary to raise the receiving rail so that the deep part of its concave is in alinement with the normal track surface, to secure the rail in such raised position either by welding the rail ends together or supporting the rails in vertical non-alinement by a detachable base-supporting or special rail joint. In either case, the original fish plate or angle plate employed in the joint is dispensed with and the expense of the repair is considerable.

My present invention has for its object to provide for the repair of such worn joints at low expense and with simple appliances. To this end I employ the method of repair which consists in raising the concave receiving rail so that the low point of its concave is in alinement with the track surface, supporting it in such raised position by fish plates or angle bars, which are slightly off-set at the line of juncture of the rails to maintain the newly effected alinement, and employing a separate off-set plate to afford support to the rail base. In many instances I find that the off-set formed in the angle bars or fish plates originally employed to effect the joint of the rail ends so closely approximates the desired elevation of the receiving rail to secure the requisite re-alinement, that the same plates or angle bars may be employed in the repair of the worn joint by simply reversing them, end for end and side for side, putting the left hand plate on the right hand side of the joint, and vice versa, so that the end of the plate or angle bar which had been depressed by the wearing action of the rail joint is connected to the leaving rail while the unworn end of the plate, formerly connected to said leaving rail, is connected to the receiving rail. Under such circumstances, the only new part required in effecting the complete repair is the base plate having a suitable off-set and arranged to afford base support to the respective rail ends in their new alinement.

In the drawings, wherein I have illustrated an embodiment of my invention, Figure 1 is a side elevation of a repaired joint; Figs. 2 and 3 are sections on lines 2—2 and 3—3 of Fig. 1 respectively; Fig. 4 is a perspective detail of a base plate; Fig. 5 is a modification of said base plate; Fig. 6 is a view similar to Fig. 1 showing another modified form of base plate; Figs. 7 and 8 are sections on lines 7—7 and 8—8 of Fig. 6, respectively; and Fig. 9 is a perspective detail of the base plate shown in Fig. 6.

In the drawings, 10 indicates a leaving rail, and 11 a receiving rail end, concaved, as at 12, by wear.

13 and 13' indicate angle bars on opposite sides of the receiving rails extending from the head of the rail to the base thereof and outward over the base. It will be understood, however, that ordinary fish plates might be used in lieu of such angle bars.

14 indicates the shoulder of an angle bar, such as is made by wear, or the angle bars or plates may be constructed with such shoulder for the purpose. When the angle bars or plates are placed upon the rail with their elevated surfaces, 14$^a$, under the concaved receiving rail and their depressed surfaces, 14$^b$, under the leaving rail, the rails are brought into new alinement such that the bottom of the concave 12 substantially alines with the normal track surface defined by the leaving rail 10. Thus, it will be understood that where angle bars, originally employed, have their upper surface distorted, to afford the shoulder 14, and are reversed end for end upon the joint, they tend to bring about realinement of the rails, as indicated in the drawings and in many instances I have found that such reversal of the plates brings about realinement of the rails suitable for all practical purposes. Further to maintain the rail in the desired position I provide for coöperation with the plates or angle bars and the rails an off-set base plate, 16, the off-set, shown at 17, being sufficient for compensating the difference in elevation between the under base surfaces of the rails due to the realinement. Each base plate 16 is preferably constructed to extend laterally beyond the rails, on both sides, and to provide spike apertures, 18, in suitable location relative to the adjoining ends, and to the rail base, to enable the spikes, 19, to grip the base portions of the angle bars, 13. The off-set, 17, may extend clear across the base, or may be provided by the interposition of a shim, 17', between a base plate of uniform thickness and the receiving or raised rail, as shown in Fig. 5. As shown in Figs. 1 to 5, the base plate has a plain lower surface and may be made of rolled material, or as shown in Figs. 6 to 9, may be integrally cast with reinforcing ribs, 20, of cross shape, strengthening the portion of the plate immediately below the adjoining ends of the rails. The latter form of plate is, of course, especially adapted for suspended joints, and the plate with the plain lower surface for a supported joint. When the rails are realined as shown in Figs. 1 and 6, the extremity of the receiving rail, between the line of juncture of the rail ends and the deepest portion of the concave 12, may be dressed to the dotted line, 23, or the excess of metal at such point may be allowed to wear off by the passage of traffic.

It will be observed that the joints which I have described are simple in construction, easily manufactured and applied, and of great economy of cost.

While I have herein described in some detail a particular embodiment of my invention, it will be apparent to those skilled in the art that numerous changes might be made in the precise details without departure from the spirit of my invention.

What I claim is:

1. The process of repairing worn railway joints to restore the concaved surface of the worn rail to normal alinement, which consists in raising and supporting the end of the worn rail of two substantially identical similar rails, with the lowest concave surface of the worn rail in the same horizontal plane as the upper surface of the adjoining rail, by reversing the worn fish plates or angle bars, side for side and end for end, and retaining said rails in said relative positions by means of a base plate having rail-receiving surfaces of different altitudes corresponding to the relative heights of the bases of said rails.

2. In a rail joint, the combination, with the meeting ends of two rails, one whereof has its upper surface worn concave, said worn rail being suitably raised and supported by reversal, side for side and end for end, of the worn fish plates; of an offset base plate 16 to positively maintain said rails in said relative position.

In testimony whereof I hereunto set my hand in the presence of two witnesses.

JAMES G. McMICHAEL.

In the presence of—
W. LINN ALLEN,
MARY F. ALLEN.

---

Copies of this patent may be obtained for five cents each, by addressing the "Commissioner of Patents, Washington, D. C."